United States Patent
Bombay

(10) Patent No.: US 6,778,622 B2
(45) Date of Patent: Aug. 17, 2004

(54) ESTIMATING TIMING ERROR IN SAMPLES OF A DISCRETE MULTITONE MODULATED SIGNAL

(75) Inventor: Bart John Bombay, Austin, TX (US)

(73) Assignee: Schlumberger Technology Corporation, Austin, TX (US)

(*) Notice: Subject to any disclaimer, the term of this patent is extended or adjusted under 35 U.S.C. 154(b) by 424 days.

(21) Appl. No.: 09/739,488

(22) Filed: Dec. 18, 2000

(65) Prior Publication Data

US 2002/0114400 A1 Aug. 22, 2002

(51) Int. Cl.[7] .......................... H04L 25/00; H04L 25/40; H04L 7/00
(52) U.S. Cl. .................... 375/371; 370/516; 375/355
(58) Field of Search .............................. 375/326, 355, 375/371, 224, 227, 260, 285, 316, 346, 354, 362, 364; 370/491, 321, 503, 206, 509, 514, 516, 500

(56) References Cited

U.S. PATENT DOCUMENTS

| | | |
|---|---|---|
| 5,345,440 A | 9/1994 | Geldhill et al. |
| 6,101,230 A | 8/2000 | Chun et al. |
| 6,175,316 B1 * | 1/2001 | Barsoum et al. ............. 341/54 |
| 6,215,819 B1 * | 4/2001 | Hyakudai et al. .......... 375/240 |
| 6,424,925 B1 * | 7/2002 | Ku et al. ..................... 702/74 |
| 6,535,549 B1 * | 3/2003 | Scott et al. ................. 375/219 |
| 2003/0063583 A1 * | 4/2003 | Padovani et al. ........... 370/329 |

FOREIGN PATENT DOCUMENTS

WO    WO 96/19056    6/1996

OTHER PUBLICATIONS

International Search Report in PCT/US01/43876 dated Jul. 23, 2002 (5 pages).

Thierry Pollet and Miguel Peeters; Synchronization with DMT Modulation; IEEE Communications Magazine; Apr. 1999; pp. 80–86.

* cited by examiner

*Primary Examiner*—Jean B. Corrielus
(74) *Attorney, Agent, or Firm*—Pehr B. Jansson; Robin Nava; Brigitte L. Echols

(57) ABSTRACT

A method and apparatus for estimating sample timing error in discrete multitone modulated signals. An unprocessed measured tone. The phase of the selected measured tone is adjusted using an average phase error. A normalized phase error for the selected measured tone is estimated. The average phase error is updated with the estimated phase error.

47 Claims, 9 Drawing Sheets

US 6,778,622 B2

ESTIMATING TIMING ERROR IN SAMPLES OF A DISCRETE MULTITONE MODULATED SIGNAL

TECHNICAL FIELD

This invention relates generally to the field of demodulating discrete multitone modulated signals, and in particular to estimating timing error in samples taken of a received discrete multitone modulated (DMT) signal.

BACKGROUND OF THE INVENTION

An almost universal goal of communications systems is to transfer information from one location to another. In many cases, the information takes the form of digital data, which is typically used to modulate a carrier to facilitate transmission.

For example, the Internet is made up of interconnected repositories of data stored all over the world. The repositories transmit the data to the computers of requesting users, where the data is displayed or used in some other way.

In an oil well drilling application, which is of particular interest to the assignee of this patent application, data regarding surrounding earth formations may be collected by wireline instruments or logging-while-drilling instruments. The instruments may analyze the collected data and transmit the collected data and the results of the analysis to the surface where further analysis is performed.

Discrete multi-tone modulation ("DMT") is a popular technique for modulating a carrier with digital information. DMT employs a group of carriers, each of which carries a portion of the data to be transferred. Each carrier is digitally modulated with its portion of the data, using, for example, Quadrature Phase Shift Keying (QPSK) or Quadrature Amplitude Modulation (QAM), and is then transmitted over a communications medium, such as a cable or an optical medium.

QPSK represents a digital symbol, i.e. group of bits to be transmitted, by phase shifting a carrier a different amount for each symbol. For example, in 8-QPSK the modulator can apply eight different phase shifts to the carrier to represent eight different three-bit symbols. QAM represents a digital symbol by applying different phase shifts and amplitude adjustments for each symbol. For example, in 256-QAM the modulator can apply 256 different combinations of phase shifts and amplitude adjustments to represent 256 different eight bit symbols. If 256 carriers are modulated using 256-QAM, a total of 256 eight bit symbols can be transmitted at the same time.

One step in demodulating a DMT signal is to sample the DMT signal, which is made up of a number of modulated carriers, at a sampling rate sufficient to preserve the information in the signal. The sampled signal is typically digitized and transformed into the frequency domain where it can be processed to recover the data that was used to create the DMT signal. One step in the processing, known as "slicing," attempts to correlate a sample with one of the possible phase modulations, in the case of QPSK, or amplitude and phase modulations, in the case of QAM.

Errors in sample timing may put all of the received data out of phase in the frequency domain. These phase errors may cause errors in the data because, as discussed above, the modulation techniques used in DMT convey information in the phase of the carriers.

A variety of techniques have been devised to correct the phase error. One common technique is to use a pilot tone to estimate the phase error. Such a pilot tone is subject to other types of system noise which may render erroneous an estimate of phase error based on an analysis of the pilot tone.

A portion of the communication bandwidth being used to transmit the DMT signal may be allocated to allow transmission of multiple pilot tones in order to average out the effect of the pilot tone noise. Such a technique will decrease the noise with the square root of the number of pilot tones being used.

Another known technique uses the data being transmitted to estimate the phase error. This technique uses the data as a block to estimate the phase error. For example, the technique may slice the data, compute slicing errors, and use the block of computed slicing errors to estimate the phase error. It may then use the estimated phase error to correct the phase of all carriers and slice the data again. This is a computationally intense algorithm which may be sensitive to slicing errors.

From the foregoing it will be apparent that there is still a need for a way to estimate the sample timing error that is computationally efficient, accurate and robust against slicing errors, without the need to allocate communication channel capacity to one or more pilot tones.

SUMMARY OF THE INVENTION

The deficiencies in the prior art are solved in the present invention which, in a preferred embodiment, provides a method and apparatus for estimating sample timing error. The method is computationally efficient, requiring only a few arithmetic operations. It is accurate, because it uses successively more accurate estimates of sample timing error. It is robust against slicing errors because it rejects slicing errors in its computations. It avoids the need to allocate communication channel capacity to one or more pilot tones because it performs its function without the use of a pilot tone or using only one pilot tone.

In one aspect of the invention, samples are taken of a signal which includes two or more measured tones, each of which has a frequency, a phase, and a magnitude. Each measured tone represents a modulated carrier in the signal. Each carrier has an associated constellation of ideal tones each of which represents an ideal modulation of its associated carrier. Before the method begins, an initial average phase error estimate is established. In one embodiment, this is accomplished by computing the average phase error from a pilot tone. In another embodiment, the average phase error is initialized to zero.

The method involves performing the following processing on each of a subset of the measured tones in the signal. The method begins by selecting an unprocessed measured tone. Next, the method adjusts the phase of the selected measured tone using an average phase error. Then, the method estimates a phase error for the selected measured tone, which includes slicing the selected measured tone. Finally, the method updates the average phase error with the estimated phase error for that tone.

In a preferred embodiment, estimating the phase error for the selected measured tone includes: (1) slicing the selected measured tone to associate it with an ideal tone; (2) computing a slicing residual for the measured tone; (3) computing an estimated phase error for the selected measured tone using the slicing residual; and (4) normalizing the estimated phase error.

In a preferred embodiment, slicing the selected measured tone includes selecting one of the ideal tones associated with the carrier associated with the selected measured tone that best approximates the selected measured tone.

In a preferred embodiment, computing the slicing residual includes subtracting a phasor representing the measured tone from a phasor representing the selected ideal tone.

In a preferred embodiment, computing the estimated phase error for the selected measured tone includes using the following equation:

$$P_k \approx \frac{imag(\langle E_k, V_k \rangle)}{w_k}$$

where $P_k$=phase error for measured tone k;

$E_k$=slicing residual for measured tone k (complex number);

$V_k$=ideal tone for measured tone k (complex number);

$\langle E_k, V_k \rangle$=inner product of $E_k$ and $V_k$;

imag(A)=imaginary part of A; and $w_k$=weighting factor for measured tone k.

In various embodiments the weighting factor $w_k$ can be: (1) the squared magnitude of the ideal tone, (2) the variance of the magnitudes of all of the ideal tones in the constellation associated with the carrier associated with the measured tone, or (3) the standard deviation of the magnitude of all of the ideal tones in the constellation associated with the carrier associated with the measured tone multiplied by the magnitude of the ideal tone. Other weighting factors can also be used.

In a preferred embodiment, normalizing the estimated phase error includes applying the following equation:

$$NP_k = \frac{P_k}{s_k}$$

where $NP_k$=normalized estimated phase error for measured tone k; and $s_k$=normalization factor for measured tone k.

In the preferred embodiment, $s_k$ is chosen to normalize the phase error computed for measured tone k to the frequency of a reference tone. In another embodiment in which the measured tones are numbered from 1 to N, the frequency of each measured tone is the number of the measured tone multiplied by the frequency of tone 1 and $s_k$ is the number of tone k.

In a preferred embodiment, updating the average phase error includes applying the following equation:

$$PNA = \left(\frac{x-1}{x}\right)^M \cdot NP_0 + \sum_{k=1}^{M} \frac{(x-1)^{M-k}}{x^{M+1-k}} \cdot NP_k$$

where

PNA=average phase error;

x=a number greater than 1;

M=the number of carriers in the signal;

$NP_0$=an initial value for PNA;

$NP_k$=normalized phase error for tone k.

In one embodiment, updating the average phase error includes applying the following equation:

$$PNA = \sum_{k=1}^{M} \frac{1}{M} \cdot NP_k$$

where

PNA=average phase error;

M=number of tones in the signal that have been processed;

$NP_k$=normalized phase error for tone k.

In one embodiment, an initial phase error $PNA_0$ is computed from a pilot tone transmitted with the signal.

In one embodiment, the subset includes all measured tones which are associated with a carrier which has a signal-to-noise ratio greater than a signal-to-noise ratio threshold. In another embodiment, the subset includes all measured tones associated with a carrier that is carrying data. In still another embodiment, the subset includes all measured tones which are associated with carriers having a frequency greater than a minimum frequency.

In a preferred embodiment, selecting comprises selecting an unprocessed measured tone that has a lower frequency than any other unprocessed measured tone. In other embodiments, not all of the constellations of ideal tones include the same number of ideal tones and selecting comprises selecting an unprocessed measured tone associated with a carrier which is associated with a constellation of ideal tones having no more ideal tones than the constellation associated with any other unprocessed measured tone. In other embodiments, selecting comprises selecting an unprocessed measured tone that is no more susceptible to slicing error because of phase error than any other unprocessed measure tone.

In a preferred embodiment, estimating and updating are performed only if a magnitude of the slicing residual for the measured tone is less than a threshold.

In a preferred embodiment, the method includes computing an average sample timing error from the average phase error.

In one embodiment, computing the average timing error includes applying the following equation:

$$\text{average sample timing error} = \frac{1}{2\pi} PNA \cdot T$$

where:

PNA=average phase error; and

T=period of a single symbol, not including a cyclic prefix.

In another equivalent embodiment, computing the average timing error includes applying the following equation:

$$\text{average sample timing error} = \frac{1}{R \cdot \pi} PNA \cdot M$$

where:

PNA=average phase error;

M=number of carriers in the signal that have been processed;

R=sampling rate.

In one embodiment, the method includes using the average sample timing error to adjust the timing of the taking of the samples of the signal.

DESCRIPTION OF THE PREFERRED EMBODIMENTS

Figure 1:
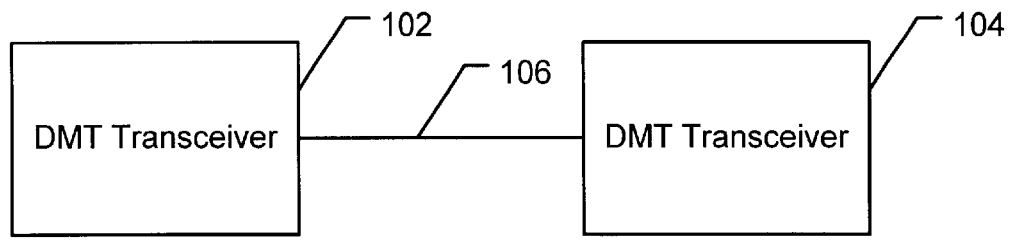
FIG. 1 is a block diagram of a DMT system including two DMT transceivers.

In the following detailed description and in the several figures of the drawings, like elements are identified with like reference numbers.

As shown in the drawings for purposes of illustration, the invention is embodied in a novel method for estimating the sample time error in samples taken of a DMT signal. The method is computationally efficient, accurate, robust against slicing errors, and avoids the need to allocate communication channel capacity to one or more pilot tones.

In the drawings, a preferred embodiment of the method for estimating sample timing error in DMT signals is illustrated. As shown in FIG. 1, a first DMT transceiver 102, capable of transmitting and receiving DMT signals, is coupled to a second DMT transceiver 104 via a communications channel 106. The communications channel 106 is any communications channel, including wire, cable, optical fiber, air, space or any other medium capable of supporting DMT transmissions.

The first transceiver is generally in a different location than the second transceiver. For example, in the well-logging environment the first DMT transceiver may be an uphole transceiver located near or at the surface and the second DMT transceiver may be a downhole transceiver coupled to, for example a downhole well logging tool. The downhole well logging tool may be a wireline tool or a logging-while-drilling tool. Many other examples will occur to persons of ordinary skill in the art.

A detailed description of the structure and operation of an example DMT transceiver 102, 104 for use in a well bore is in copending U.S. patent application Ser. No. 09/471,659, entitled METHOD AND APPARATUS FOR TRANSMISSION OF WELL-BORE DATA ON MULTIPLE CARRIER FREQUENCIES, filed on Dec. 24, 1999, which is incorporated by reference. This is merely an example of a DMT transceiver and should not be seen to limit the invention described herein.

Figure 2:
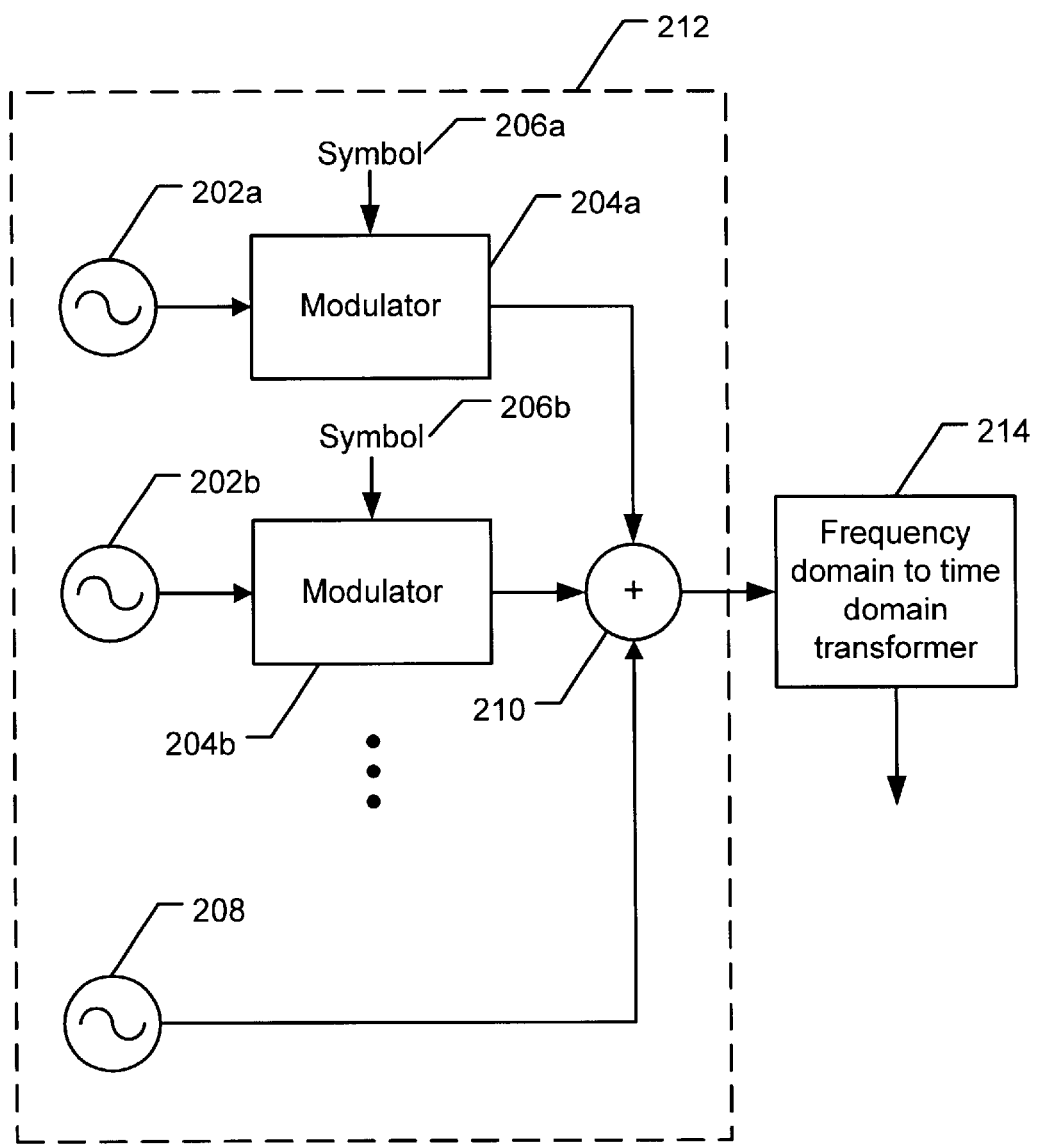
FIG. 2 is a conceptual block diagram of a portion of a transmit portion of a DMT transmitter.

FIG. 2 illustrates some of the functions of the transmitter portion of the DMT transceivers 102 and 104. FIG. 2 should not be seen as a complete drawing of a DMT transceiver. It only illustrates the functions and structure that are important to understand the invention described herein.

A plurality of carriers 202a, 202b (and others indicated by the ellipsis) are modulated by modulators 204a, 204b (and others indicated by the ellipsis) with symbol data 206a, 206b. In one embodiment, the carrier frequencies are evenly spaced over a range of frequencies. For example, there may be 100 carriers evenly spaced over the band from 150 kHz to 250 kHz.

The range of symbol data 206a, 206b that can be applied to the modulators 204a, 204b, defines a "constellation" of "ideal tones" for each carrier. For example, if the modulators 204a, 204b are QAM modulators, the ideal tones can be as shown in FIGS. 3–6, which are phasor diagrams of a modulated carrier with the dots representing the ideal tones.

Figure 3:
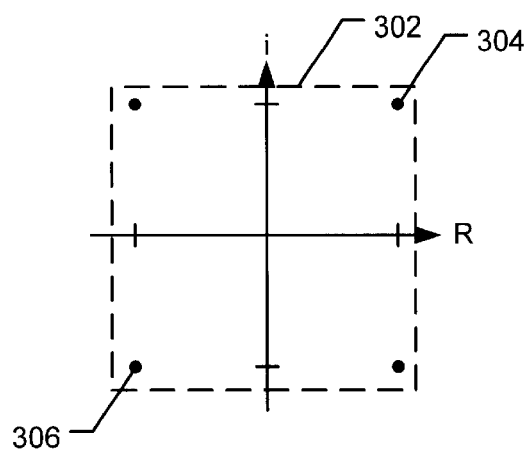
FIGS. 3–6 illustrate constellations of ideal points in QAM modulation.
Figure 4:
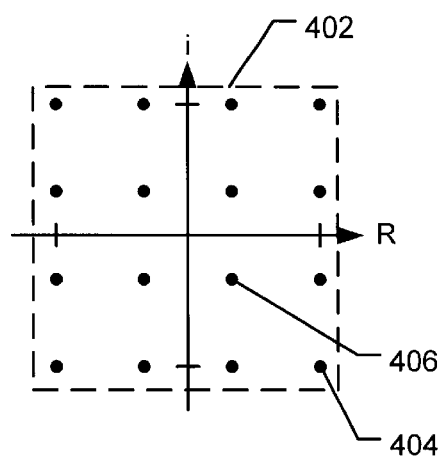
Figure 5:
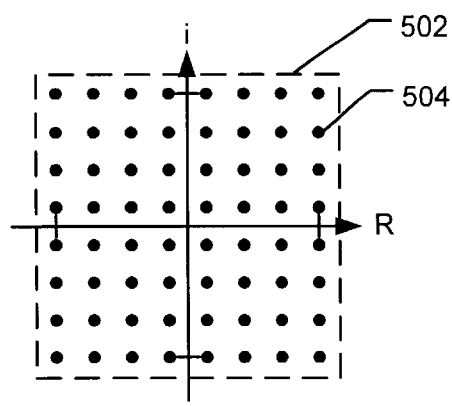
Figure 6:
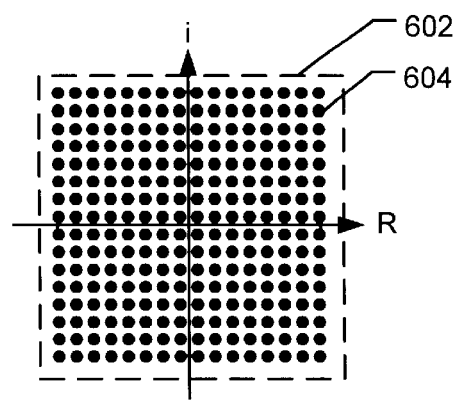

In FIG. 3, the symbol data 206a, 206b has two bits, resulting in a constellation 302 of four ideal tones e.g., 304. In FIG. 4, the symbol data 206a, 206b has four bits, resulting in a constellation 402 of sixteen ideal tones e.g., 404. In FIG. 5, the symbol data 206a, 206b has six bits, resulting in a constellation 502 of 64 ideal tones e.g., 504. In FIG. 6, the symbol data 206a, 206b has eight bits, resulting in a constellation 602 of 256 ideal tones e.g., 604.

In the phasor diagrams shown in FIGS. 3–6, the ideal tones can be represented as complex numbers. For example, in FIG. 3, ideal tone 304 can be represented as the complex number 1+i or (1, 1). Ideal tone 306 can be represented as the complex number −1−i or (−1, −1). In FIG. 4, ideal tone 404 can be represented as the complex number 1−i or (1,−1). Ideal tone 406 can be represented as the complex number a (1−i) or (a, −a).

Returning to FIG. 2, in some embodiments, an unmodulated pilot tone 208 is generated to provide a reference when the modulated signal is received and processed.

A summer 210 adds the modulated carriers 202a, 202b and the pilot tone 208. In some embodiments, the functions of generating and modulating the carriers 202a, 202b, generating the pilot tone 208, and summing the modulated carriers 202a, 202b and pilot tone 208, along with other functions not shown in the drawing, are performed entirely in the frequency domain, as shown by the dashed box 212 in FIG. 2. In other embodiments, some of these functions are performed in the time domain.

The summed carriers and pilot tone are transformed into the time domain by a frequency domain to time domain transformer 214, such as a fast Fourier transformer.

Figures 7, 8:
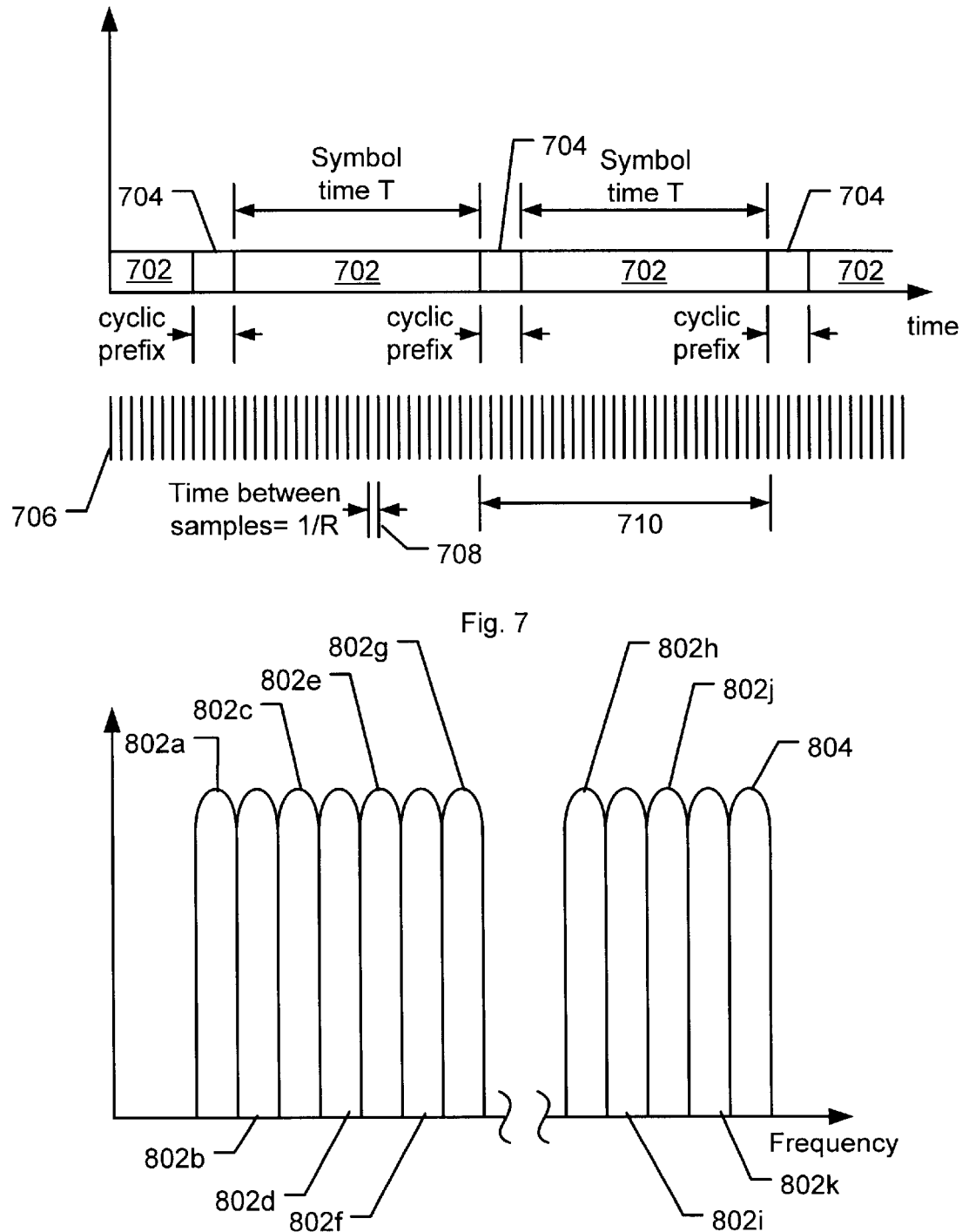
FIG. 7 illustrates a time domain representation of a DMT signal.
FIG. 8 illustrates a frequency domain representation of a DMT signal.

The resulting signal, illustrated in the time domain in FIG. 7, includes symbols 702, with a symbol time T, separated by cyclic prefixes 704. During a symbol time 702, the symbol data does not change and each carrier is modulated with one of the constellation 302, 402, 502, 602 of ideal tones that is associated with it. Thus, during each symbol time T, the signal conveys a quantity of bits defined by the number of bits in the symbol data 206a, 206b.

During each symbol time T, the signal, illustrated in the frequency domain in FIG. 8, includes a set of carriers 802a–k modulated with symbol data and an unmodulated pilot tone 804.

Figure 9:
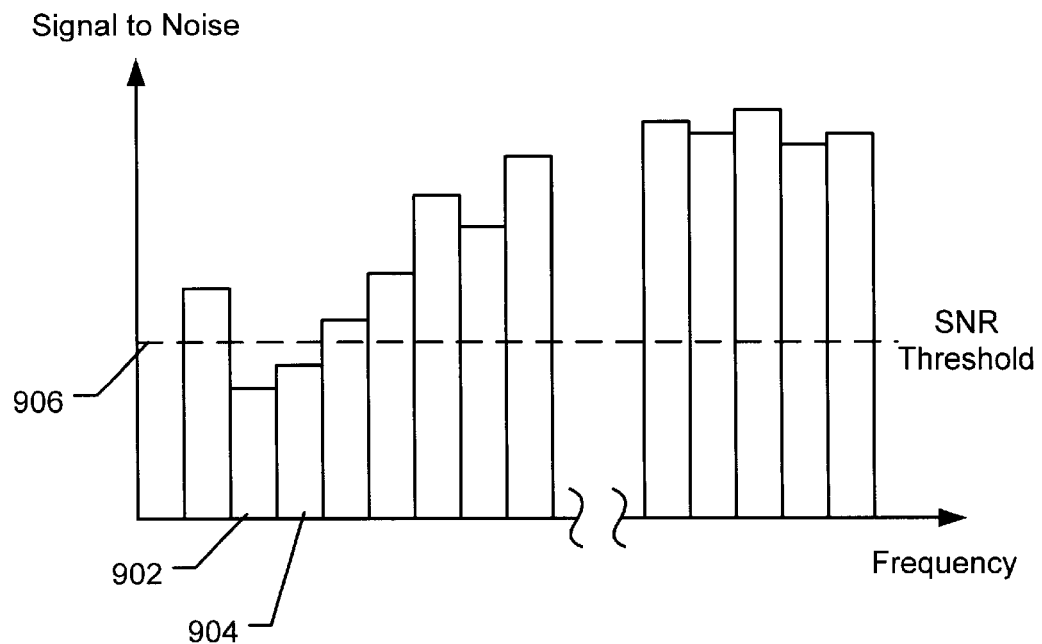
FIG. 9 illustrates the variation of the signal to noise ratio for the various carriers in a DMT signal.
Figure 10:
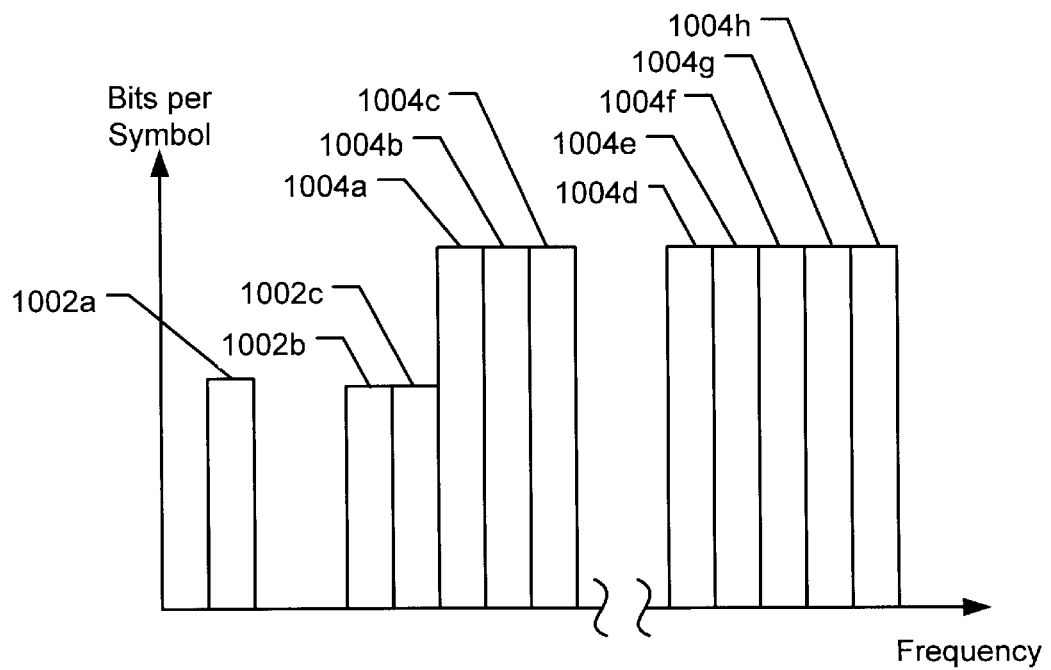
FIG. 10 illustrates the bits per symbol for the various carriers in a DMT signal.

In some embodiments, not all of the carriers 802a–k are modulated with symbol data and not all of the carriers that carry symbol data carry the same amount of symbol data. A preferred embodiment of a process for determining whether and how much symbol data is carried by each carrier is illustrated in FIGS. 9 and 10. The two DMT transceivers 102, 104 determine the signal to noise ratio (SNR) on the communication channel 106 for each of the carriers 802a–k, as shown in FIG. 9. As can be seen in the example illustrated in FIG. 9, the SNR for bands 902 and 904 of the communications channel 106 corresponding to two of the carriers falls below an SNR threshold 906. The SNR threshold 906 is set to distinguish between bands of the communications channel 106 that can carry DMT data with an acceptable bit error rate (BER) and bands that cannot. In the example shown in FIG. 9, the carriers corresponding to the bands 902, 904 of the communication channel 106, which have low SNRs, would not be used to carry data.

This is illustrated in FIG. 10, which show that the carriers corresponding to the bands 902, 904 of the communication channel 106 carry no data. FIG. 10 also illustrates that some bands 1002a–c of the communications channel 106 carry less data than other bands 1004a–h. The amount of data carried by each carrier is adjusted according to the SNR of the band of the communications channel that will carry the carrier. Carriers associated with bands of the communications channel with high SNR carry more data than carriers associated with bands of the communications channel with low SNR. Carriers that carry more data will have a larger constellation of ideal points, e.g., 502, than carriers that carry less data, e.g., 302.

Figure 11:
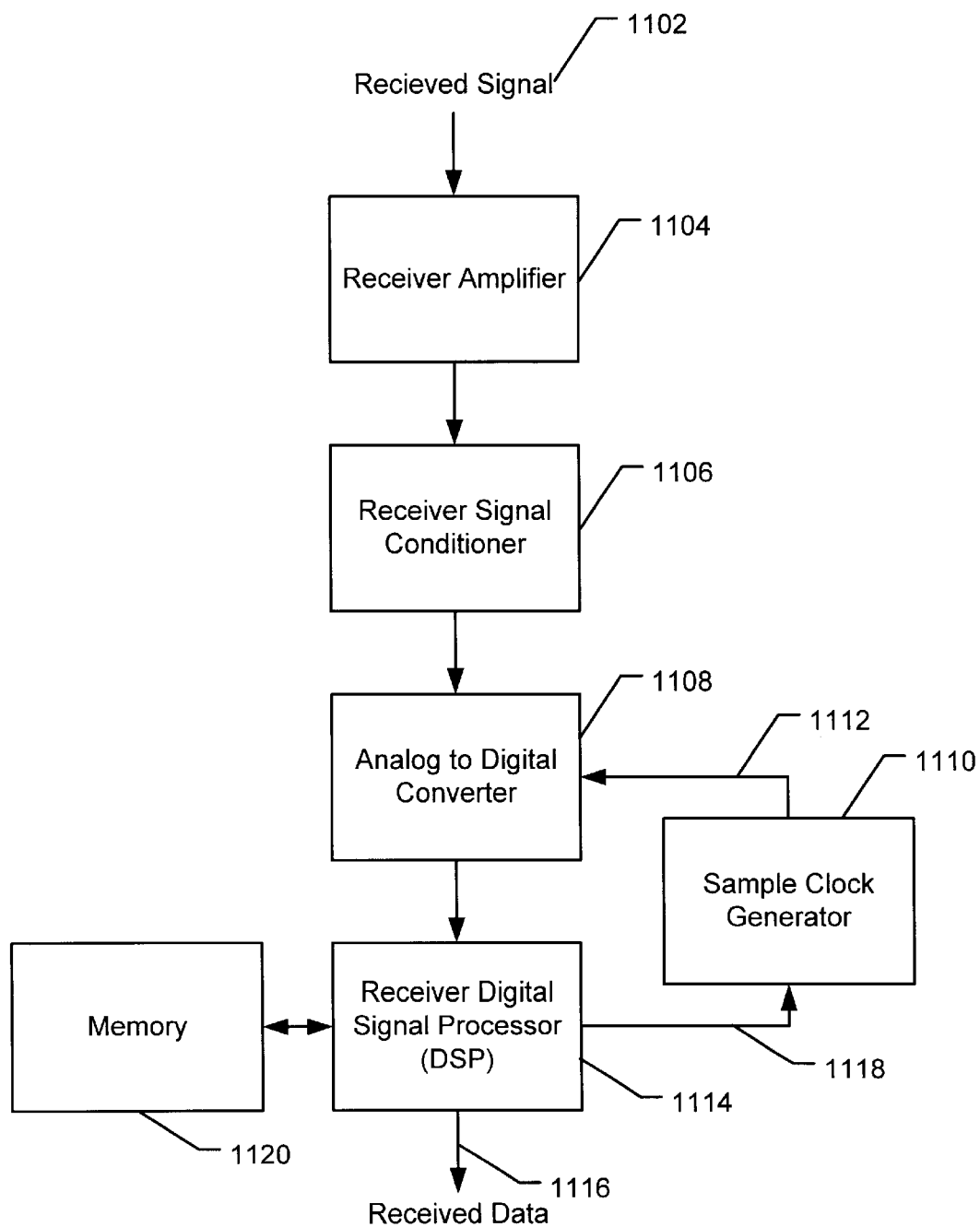
FIG. 11 is a block diagram for a DMT receiver.

In one embodiment of the receive portion of the DMT transceivers 102, 104, illustrated in FIG. 11, a DMT signal 1102 is received and amplified by a receiver amplifier 1104. The received signal is then conditioned by a receiver signal conditioner 1106 and sampled and digitized by an analog to digital converter (ADC) 1108 at a rate defined by a sample clock generator 1110 through clock signal 1112. As shown in FIG. 7, samples 706 are taken at a rate of R samples per second resulting in a time between samples 708 of 1/R. Returning to FIG. 11, the output of the ADC 1108 is processed by a receiver digital signal processor (DSP) 1114, as described below in the description of FIGS. 12 and 13. The receiver DSP 1114 produces received data 1116 and a signal 1118 that adjusts the clock signal 1112 output of the sample clock generator 1110. A memory 1120, which can be RAM, ROM, PROM, EPROM, a disk drive, an optical drive, or any other form of memory or combination of any or all of those forms of memory, stores the program for the DSP and provides short term storage for the DSP.

Figure 12:
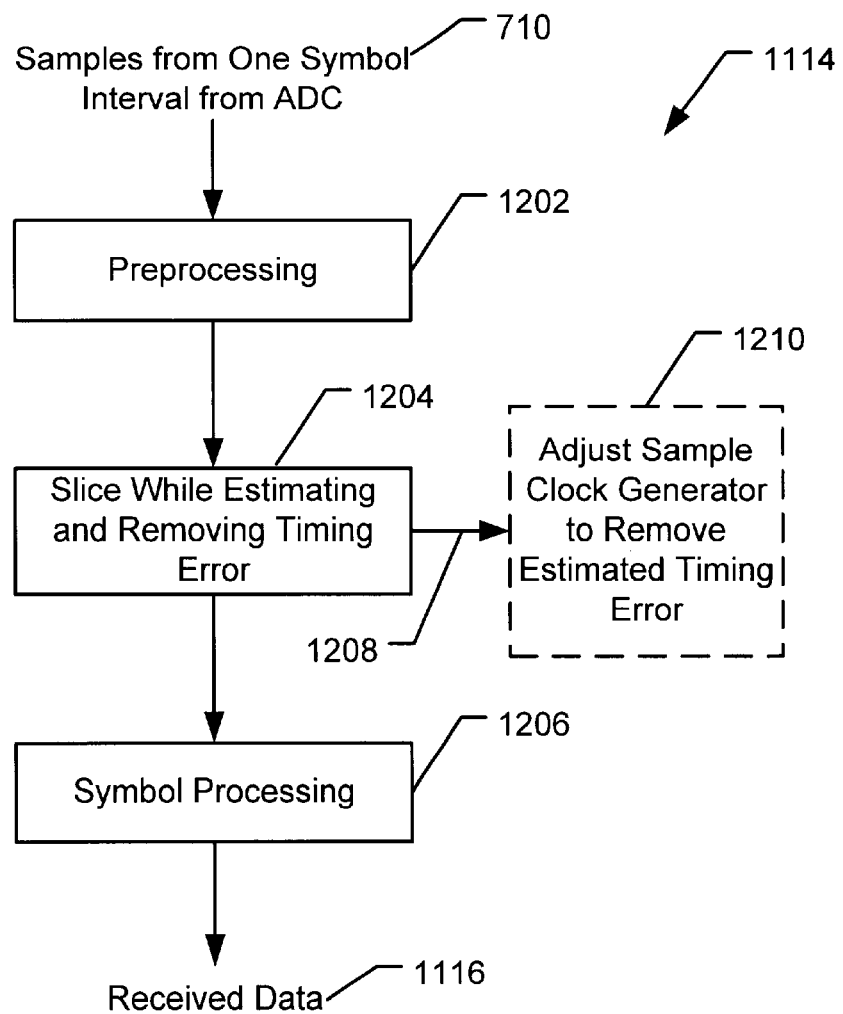
FIG. 12 is a high level flow chart for the data processing done within a DMT receiver.

The processing performed by the receiver DSP 1114, which is shown in more detail in FIG. 12, receives samples from one symbol interval 710 (FIG. 7) from the ADC 1108. In a preferred embodiment, there are 528 samples for each DMT symbol which are processed with, among other processes, a time domain equalizer, to yield 512 samples. The samples in the symbol interval 710 are preprocessed 1202 to produce the data to be sliced.

The output of the preprocessing 1202 is a set of complex numbers representing measured tones, each of which is associated with one of the carriers 202a, 202b. The complex numbers representing the measured tones are not necessarily the same as the complex numbers representing the ideal tones because they include noise. The measured tones are then sliced while removing the timing error 1204, which is described in detail below in the description of FIG. 13. The resulting symbol data is then processed 1206 to produce received data 1114.

The slicing process 1204 also produces an estimated timing error 1208, which in some embodiments is used to adjust the sample clock generator 1108 to remove the estimated timing error 1210. This is an optional feature, as indicated by the fact that block 1210 has a dashed outline.

The startup training of the system quickly stabilizes the receiver sampling clock to be close to the same frequency as the transmitter sampling clock. After this point, the sample timing error is relatively small. It is during this period where the timing error is small that the timing error estimation technique described herein provides the most benefit. Due to quantization noise and other noise sources, the timing error will never converge all the way to zero, but will always contain some jitter. Furthermore, the oscillator of the transmitter's sample clock will likely drift in frequency over time (e.g., as the result of changes in temperature). Further, the accuracy of the receiver sample timing generator will depend upon a number of things:

a) the stability of the transmitter's sample clock;
  b) the accuracy of the receiver's estimate of sample timing error;
  c) the design of the receiver clock synchronization algorithm;
  d) the severity of the various noise sources that affect the receiver; and
  e) the design limitations of the sample clock generator.

The timing error estimation technique described herein compensates for all of these effects.

Figure 13:
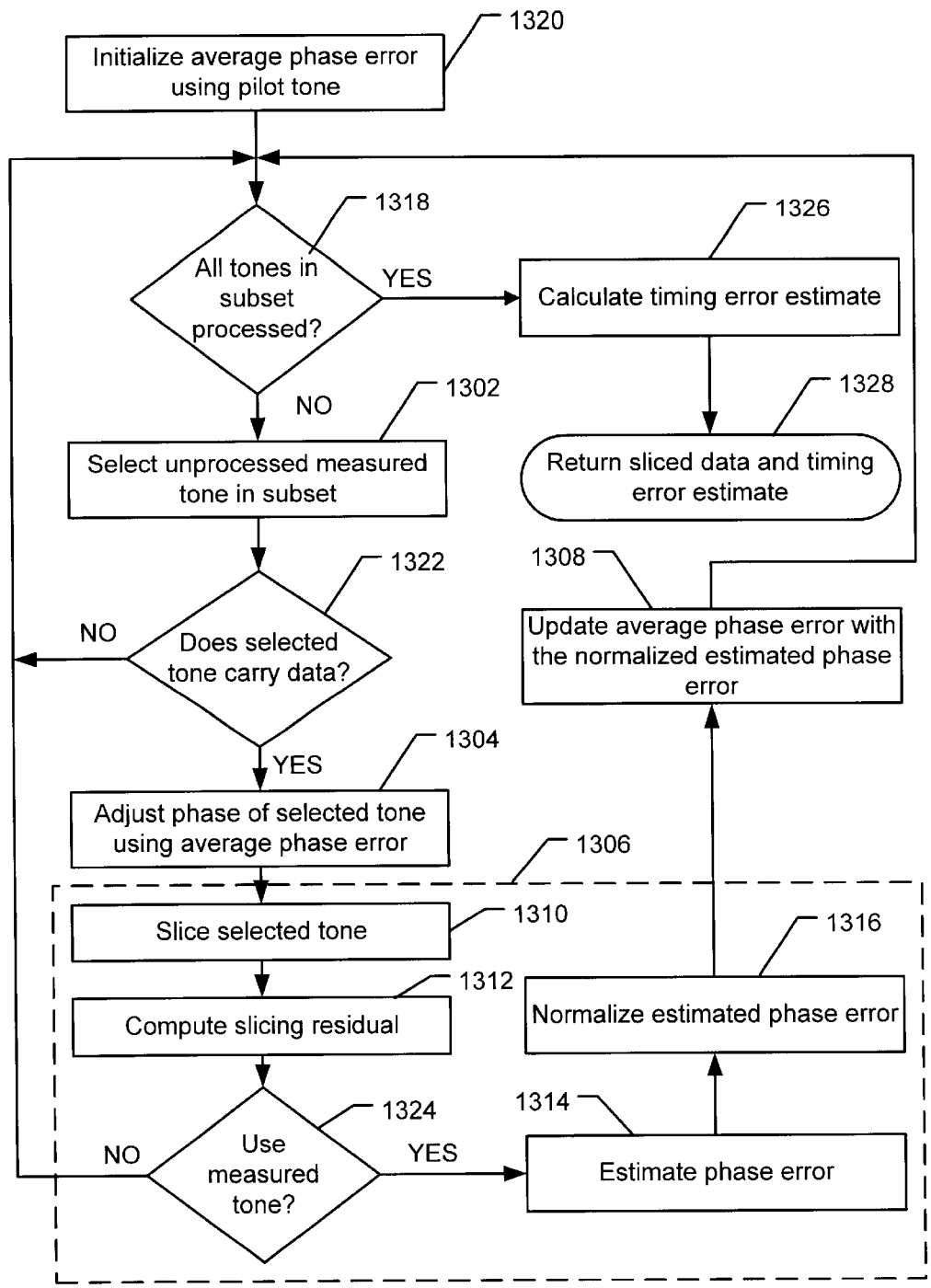
FIG. 13 is a flow chart of the processing performed to slice while estimating and removing timing error.

A preferred method for slicing while estimating and removing timing error 1204 is illustrated in more detail in FIG. 13. The method estimates an average sample timing error in samples from one symbol time 710 of a signal 1102 that includes a set of measured tones 802a–k. Each measured tone 802a–k has a frequency, a phase, and a magnitude. Each measured tone 802a–k represents one of a set of modulated carriers 202a, 202b. Each carrier has an associated constellation 302, 402, 502, 602 of ideal tones. Each ideal tone, e.g., 304, represents an ideal modulation of its associated carrier 202a, 202b.

The method includes performing the following processing on each of a subset of the measured tones in the signal. First, the method initializes the average phase error using a pilot tone (block 1320). Alternatively, the method may initialize the average phase error to zero. The method then enters a loop in which the first step is to determine if all measured tones in the subset of measured tones to be processed have been processed (block 1318). If they have not, the method selects an unprocessed measured tone in the subset (block 1302). If the selected measured tone does not carry data (block 1322), the method returns to the beginning of the loop and selects another tone (blocks 1318, 1322). Otherwise, the method adjusts the phase of the selected measured tone using the average phase error (block 1304). The method next estimates the phase error for the selected measured tone (dashed block 1306). The method next updates the average phase error with the estimated phase error (block 1308). Once all of the measured tones have been processed (block 1318), the method yields a timing error estimate (block 1326) and returns the sliced data and the timing error estimate (block 1328).

In a preferred embodiment, estimating the phase error for the selected measured tone (dashed block 1306) includes slicing the selected measured tone to associate it with an ideal tone (block 1310). The method then computes a slicing residual for the measured tone (block 1312) and decides based on the slicing residual whether to use the selected measured tone to estimate the average phase error (block 1324). For example, if the magnitude of the slicing residual is greater than a threshold, the slice is assumed to be unreliable and the measured tone is not included in the process of estimating the average phase error. Other methods could also be used to make this determination.

The method next computes an estimated phase error for the selected measured tone using the slicing residual (block 1314) and normalizes the estimated phase error (block 1316).

Figure 14:
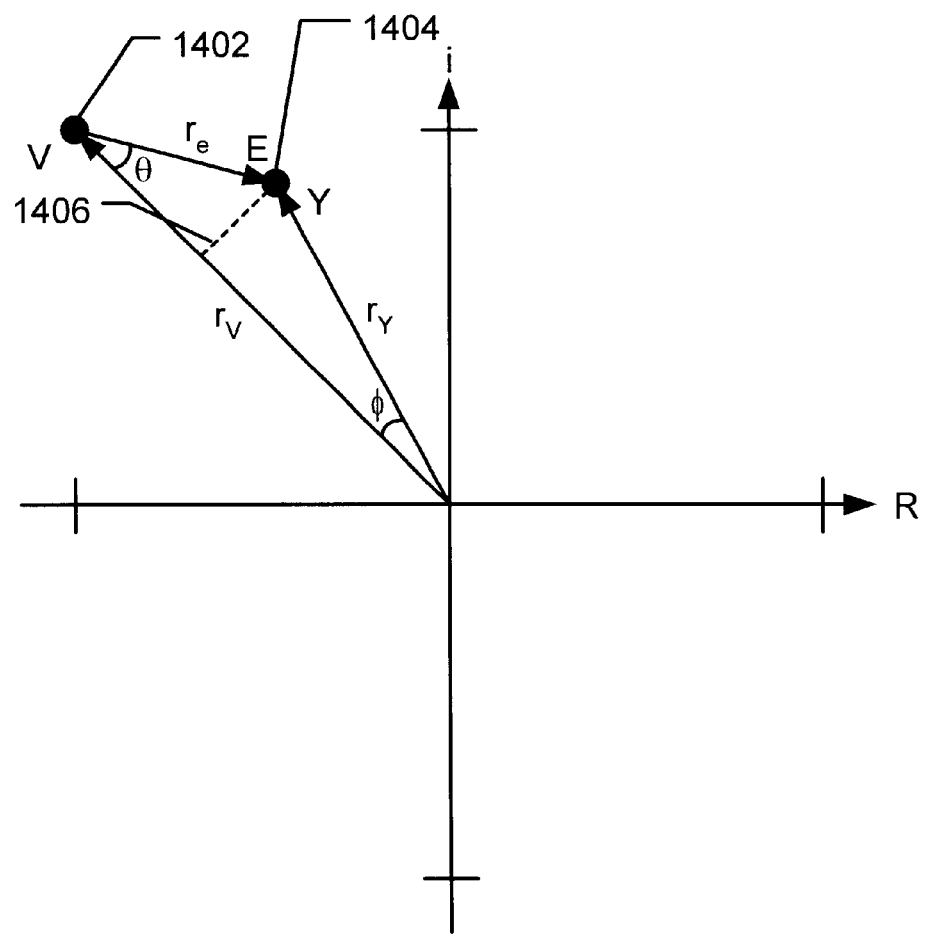
FIG. 14 is a phasor diagram illustrating the process of estimating phase error.

In a preferred embodiment, as illustrated in FIG. 14, slicing the selected measured tone (block 1310) includes selecting one of the ideal tones 1402 associated with the carrier 202a, 202b associated with the selected measured tone 1404 that best approximates the selected measured tone 1404.

In a preferred embodiment, computing the slicing residual E (block 1312) includes subtracting a phasor V representing the selected ideal tone from a phasor Y representing the measured tone.

Figure 15:
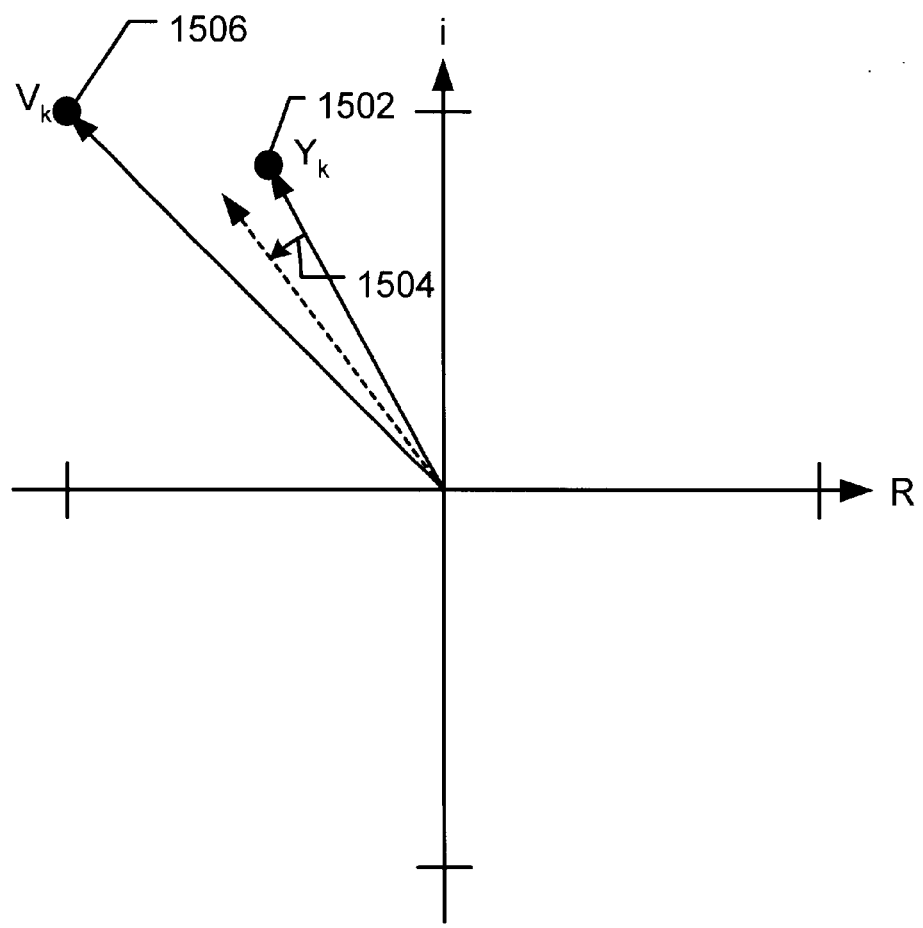
FIG. 15 is a phasor diagram illustrating adjusting the phase of a measured tone.

A preferred embodiment for adjusting the phase of the selected measured tone 1502 using the average phase error 1504 (block 1304) is illustrated in FIG. 15. The phase of the selected measured tone 1502 is adjusted by the amount of the average phase error 1504 computed at that time before the phase error associated with the measured tone 1502 and the ideal tone 1506 is used to refine the average phase error for the next measured tone.

The theory behind computing the estimated phase error (block 1314) is illustrated in FIG. 14, which shows a phasor diagram of the selected measured tone 1404 and the ideal tone 1402 with which the selected measured tone 1404 was associated during slicing. The phasor V, having a magnitude $r_V$, extends from the origin to the ideal tone 1402 and a phasor Y, having a magnitude $r_Y$, extends from the origin to the measured tone 1404. The angle $\phi$ between Y and V is the phase error. The phasor E=Y−V is known as the "slicing residual." Slicing residual is different from "slicing error," which is the failure to associate the measured tone with the ideal tone intended by the transmitter. In most cases, $r_e$, the magnitude of E, will be much smaller than that shown in FIG. 14. The phasors V and E have an angle θ between them.

If the magnitude of the slicing residual phasor E, is small in comparison to the magnitude of the ideal tone phasor V, then the phase error $\phi$ can be approximated as follows:

$$\phi \approx \sin(\phi) \tag{1}$$

From FIG. 13, it can also be seen that, under the same condition:

$$r_V \sin(\phi) \approx r_e \sin(\theta) \tag{2}$$

The right side of the above equation is the magnitude of the component of E that is perpendicular to V. Notice that $r_V$ could be replaced by $r_Y$ in equation (2).

$r_e \sin(\theta)$ is the magnitude of the component 1406 of E that is perpendicular to V. This value can be easily and efficiently computed by computing the inner product of E and V:

$$\langle E, V \rangle = E \cdot V^*$$
$$= r_e(\cos\alpha + j\sin\alpha) \cdot r_v(\cos\beta - j\sin\beta)$$
$$= r_e r_v[(\cos\alpha\cos\beta + \sin\alpha\sin\beta) + j(\sin\alpha\cos\beta - \sin\beta\cos\alpha)]$$
$$= r_e r_v[\cos(\alpha - \beta) + j\sin(\alpha - \beta)]$$

where α is the angle E makes with the real axis and β is the angle V makes with the real axis.

If the complex plane is rotated until the real axis aligns with V, then β=0 and α=θ, the angle that E makes with V. Then:

$$\langle E, V \rangle = r_e r_v(\cos\theta + j \sin\theta) \text{ and}$$

$$imag\langle E, V \rangle = r_e r_v \sin\theta$$

Rearranging the equation and making the substitution suggested by equation (2):

$$r_v^2 \sin\phi = imag\langle E, V \rangle$$

Making the substitution suggested by equation (1):

$$\phi \approx \frac{imag\langle E, V \rangle}{r_v^2} \tag{3}$$

Another way to compute imag<E,V> is to use the coordinates of V and E on the complex plane, as illustrated below:

$$E = e_r + je_i$$

$$V = V_r + jv_i$$

$$\langle E, V \rangle = (e_r + je_i) \cdot (v_r - jv_i)$$

$$= e_r v_r + e_i v_i + j(e_i v_r - e_r v_i)$$

$$imag\langle E, V \rangle = e_i v_r - e_r v_i$$

Substituting this result into equation (3):

$$\phi \approx \frac{e_i v_r - e_r v_i}{r_v^2} \tag{4}$$

As is readily seen, equation (4) for estimating phase error is a very simple and computationally efficient equation.

Stated more generally, the estimated phase error for the selected measured tone can be computed using an equation such as equation (5) (persons of ordinary skill will recognize that other forms of equations could be used to estimate phase error):

$$P_k \approx \frac{imag(\langle E_k, V_k \rangle)}{w_k} \tag{5}$$

where $P_k$=phase error for measured tone k;

$E_k$=slicing residual for measured tone k (complex number);

$V_k$=ideal tone for measured tone k (complex number);

<$E_k,V_k$>=inner product of $E_k$ and $V_k$;

imag(A)=imaginary part of A; and $w_k$=weighting factor for measured tone k.

The factor $w_k$ is introduced to allow adjustment to the approximation due to the inventor's observation that phase error approximations using the method described above are not as accurate when the magnitude of the error phasor E approaches the magnitude of the ideal tone phasor V. This typically happens when SNR is low, such as when it is necessary to use 2 bit constellations to achieve the desired BER.

This is not the only source of error in the approximation, however. In fact, the error measured for any given sample is a combination of the phase error induced by an error in sample timing and the error introduced by other noise sources. Assuming that the noise introduced by other sources is additive to the demodulated complex data point, that is, the measured tone 1404, the magnitude of the error introduced by other sources will tend to be independent of the position within the constellation. On the other hand, the error induced by the error in sample timing will tend to be proportional to the distance from the origin. To put it another way, the percentage of the error that is caused by the sample timing tends to be greater for the outside constellation points, i.e., for those points, e.g., 406, close to the origin, and less for the inside constellation points, i.e., for those points, e.g., 404, far from the origin. The effect of this is that when estimating the sample timing error by measuring the error in the constellation, the estimate is better for the outside points, and less accurate for the inside points. The small constellations 302 (e.g., two bits) behave like inside points in this regard, and therefore offer less accurate measures of the sample timing error.

This statistical property of the errors can actually work in favor of accuracy with an appropriately configured algorithm. Before discussing that, it is important to understand the statistics at a more basic level. For each carrier, it is possible to estimate the sample timing error, but the estimate will be corrupted by other noise sources because the slicing residual consists of not only the phase error introduced by that timing error, but also other noise sources. However, the error introduced by sample timing error has a predictable pattern over the set of carriers, while the error introduced by other sources will tend to be random in comparison (i.e., statistically independent). Therefore, averaging over all the carriers will strengthen the estimate of the sample timing error while averaging out the error from other sources.

Suppose, for example, that the DMT signal is carrying data on 200 carriers and the normalized phase error from all 200 carriers is averaged to estimate the sample timing error:

$$\sum_{k=1}^{200} \frac{1}{200} NP_k \quad (6)$$

where $NP_k$ is the normalized phase error (discussed below) for tone k.

This treats each carrier the same, regardless of whether the received data point is close or far from the origin. But, as discussed above, the accuracy of the estimate improves proportionally with the distance of the complex number representation of the ideal tone from the origin. It therefore makes sense to more heavily weight those points that are far from the origin.

To accomplish this weighting, observe that in equation (3) for the approximation of P, the denominator is $<V,V>=r_v^2$, which is the magnitude squared of the ideal vector. If instead the denominator is an average value of $<V,V>$, i.e., the variance of V, then the average would be weighted by the square of the distance from the origin (which would avoid the necessity of calculating $<V,V>$ for each point). This gives the desired extra weight to the outside points, but it is important to be careful not to give too much weight to those points, since they are squared terms. Another algorithm divides by the average magnitude of V (the standard deviation of V) times the magnitude of V. The second method (squared weighting) is preferable since the standard deviation of an averaged value decreases only with the square root of the number of samples averaged, and by using squared weighting, this effect is offset.

Thus, if it is not desired to give additional weight to the outside points, the result in equation (3) is used and $w_k=<V_k, V_k>=r_v^2$.

If it is desired to give additional weight to outside points, $w_k=\text{var}(V)$ where $\text{var}(V)$ is the variance of the magnitudes of all of the ideal tones in the constellation associated with the carrier associated with measured tone k.

If another form of weighting is desired, then $w_k=\text{dev}(V) \cdot \text{mag}(V_k)$ where $\text{dev}(V)$ is the standard deviation of the magnitudes of all of the ideal tones in the constellation associated with the carrier associated with measured tone k and $\text{mag}(V_k)$ is the magnitude of $V_k$.

The following equation is applied to normalize the estimated phase error (block 1316):

$$NP_k = \frac{P_k}{s_k} \quad (7)$$

where $NP_k$=normalized estimated phase error for measured tone k;

$P_k$=estimated phase error for measured tone k; and $s_k$=normalization factor for measured tone k.

In the preferred embodiment, $s_k$ is chosen to normalize the phase error computed for measured tone k to the frequency of a reference tone. For example, in one embodiment, the measured tones are numbered from 1 to N and the frequency of each measured tone is the number of the measured tone multiplied by the frequency of tone 1. In that case:

$s_k$=the number of measured tone k.

Estimating the phase error (block 1314) and normalizing the estimated phase error (block 1316) can be accomplished by applying the following equation:

$$NP_k = \frac{imag(\langle E_k, V_k \rangle)}{s_k \cdot \langle V_k, V_k \rangle} \quad (8)$$

where $NP_k$=normalized estimated phase error for measured tone k;

$E_k$=slicing residual for measured tone k (complex number);

$V_k$=ideal phasor associated with measured tone k (complex number);

$s_k$=normalization factor for measured tone k;

$<V_k,V_k>$=inner product of $V_k$ with itself; and imag(A)=imaginary part of A.

If it is desired to give the outside ideal tones more weight than the inside ideal tones in the same constellation, it can be seen that estimating the phase error (block 1314) and normalizing the estimated phase error (block 1316) can be accomplished by applying the following equation:

$$NP_k = \frac{imag(\langle E_k, V_k \rangle)}{s_k \cdot \text{var}(V)} \quad (9)$$

where $NP_k$=normalized estimated phase error for measured tone k;

$E_k$=slicing residual for measured tone k (complex number);

$V_k$=ideal tone for measured tone k (complex number);

$s_k$=normalization factor for measured tone k;

$<E_k,V_k>$=inner product of $E_k$ and $V_k$;

imag(A)=imaginary part of A; and var(V)=variance of the magnitudes of all of the ideal tones in the constellation associated with measured tone k.

If it is desired to give the outside ideal tones more weight than the inside ideal tones in the same constellation using a different formulation, it can be seen that estimating the phase error (block 1314) and normalizing the estimated phase error (block 1316) can be accomplished by applying the following equation:

$$NP_k = \frac{imag(\langle E_k, V_k \rangle)}{s_k \cdot dev(V) \cdot mag(V_k)} \quad (10)$$

where $NP_k$=normalized estimated phase error for measured tone k;

$E_k$=slicing residual for measured tone k (complex number);

$V_k$=ideal tone for measured tone k (complex number);

$s_k$=normalization factor for measured tone k;

$\langle E_k, V_k \rangle$=inner product of $E_k$ and $V_k$;

imag(A)=imaginary part of A;

dev(V)=standard deviation of the magnitudes of all of the ideal tones in the constellation associated with measured tone k; and $mag(V_k)$=magnitude of $V_k$.

The average phase error is updated (block 1308) by applying the following equation:

$$PNA = \sum_{k=1}^{M} \frac{1}{M} \cdot NP_k \quad (11)$$

where

PNA=average phase error;

M=number of tones in the signal that have been processed;

$NP_k$=normalized phase error for tone k.

In the discussion of updating the average phase error (block 1308) in the preceding paragraph, the phase error for each measure tone is given the same weight (i.e., each is divided by 1/M). In some circumstances, the phase error contributions from each carrier are weighted exponentially and updating the average phase error (block 1308) is accomplished by applying the following equation:

$$PNA = \left(\frac{x-1}{x}\right)^M \cdot NP_0 + \sum_{k=1}^{M} \frac{(x-1)^{M-k}}{x^{M+1-k}} \cdot NP_k \quad (12)$$

where

PNA=average phase error;

x=a number greater than 1;

M=the number of carriers in the signal;

$NP_0$=an initial value for PNA;

$NP_k$=normalized phase error for tone k.

In this equation, x is the effective number of carriers represented in the average. A larger x means the estimate is more stable but takes longer to converge. $NP_0$ is derived from a pilot tone or it is simply set to zero.

This equation is very efficient to implement in code, as is shown below:

$$PNA_0 = NP_0 \quad (13)$$

$$PNA_k = PNA_{k-1} + \left(\frac{1}{x}\right) \cdot [NP_k - PNA_{k-1}] \quad (14)$$

Once the average phase error is updated (block 1308), the method continues by returning to the beginning of the loop illustrated in FIG. 13. If all of the measured tones have been processed (block 1318) the method exits the loop and estimates the timing error (discussed below). If there are measured tones in the subset (discussed below) that have not yet been processed, the method selects the next unprocessed measured tone (block 1302) and repeats the processing described above.

As discussed above, the method processes only a subset of the measured tones. The subset may include all of the measured tones. In the preferred embodiment, however, the subset includes all measured tones which are associated with carriers 202a, 202b which have a signal-to-noise ratio greater than a signal-to-noise ratio threshold 906. In another embodiment, the subset includes all measured tones associated with carriers 202a, 202b that are carrying data. In still another embodiment, the subset includes all measured tones which are associated with carriers having a frequency greater than a minimum frequency (or, if the measured tones are numbered as discussed above, the subset includes all measured tones with numbers greater than a minimum number). Note that the three subsets just described may be the same. That is, the measured tones which are associated with carriers 202a, 202b which have a signal-to-noise ratio greater than a signal-to-noise ratio threshold 906 may be the same subset as the measured tones associated with a carrier 202a, 202b that are carrying data which may be the same subset as the measured tones numbered greater than a minimum number. Other embodiments may use other subsets of measured tones.

In a preferred embodiment, selecting an unprocessed measured tone (block 1302) includes selecting an unprocessed measured tone that has a lower frequency than any other unprocessed measured tone. In this embodiment, the method would work its way through the measured tones from the lowest frequency measured tone to the highest frequency measured tone.

This approach arises from observation that the lower frequency carriers are much less sensitive to an error in sample timing than the high frequency carriers. Therefore, a less accurate measure of the sample timing error will still satisfactorily slice the lower frequency carriers. Thus, in the preferred embodiment, the algorithm begins with the low frequency carriers.

In some embodiments, the phase error estimate PNA is initialized based upon a pilot tone transmitted with the signal (block 1320). Alternatively, the initial phase error estimate PNA may be set to zero. For the lowest frequency carrier, the phase correction based upon the initial PNA is applied. That carrier is then sliced, the slicing residual E is calculated and used to update the estimate of the average phase error PNA, as discussed above.

This updated PNA is used in the algorithm for the carrier with the next lowest frequency, and then the algorithm proceeds iteratively until all the carriers in the DMT symbol have been processed. By the time the higher frequency carriers, which are more sensitive to the sample timing error, are processed, the estimate has been updated and is accurate enough to allow proper slicing of those carriers.

Another embodiment takes advantage of the fact that not all of the constellations of ideal tones include the same number of ideal tones. For example, some of the constellations 302 may include only four ideal tones while other constellations 502 may include 64 ideal tones. In general, all other things being equal, constellations with fewer ideal tones are less susceptible to slicing errors than constellations with more ideal tones.

Thus, in this embodiment of the invention, selecting the next unprocessed measured tone includes selecting an unprocessed measured tone associated with a carrier which is associated with a constellation of ideal tones having no more ideal tones than the constellation associated with any other unprocessed measured tone. Within the set of measured tones which have the same constellation size, the method may select the measured tones in frequency order.

In another embodiment, selecting the next unprocessed measured tone includes selecting an unprocessed measured tone that is no more susceptible to slicing error because of phase error than any other measured tone. In some circumstances, this embodiment might yield the same results as one of the other embodiments. For example, if the size of the constellations associated with the carriers increases with the frequency of the carrier and all other things are equal, this embodiment will select the measured tones in order from the lowest frequency to the highest frequency.

In some embodiments, the subset includes all measured tones which are associated with carriers having a frequency greater than a minimum frequency. This will have the effect of excluding the lowest frequency carriers. While the lowest frequency carriers are less sensitive to errors in sample timing, the slicing residuals for those carriers are very poor indicators of the sample timing error because their slicing errors are dominated by other, unrelated noise sources. If these lowest frequency carriers are used to update PNA, the PNA estimate may be corrupted with noise rather than being improved. This situation is made even more severe by the fact that the lowest frequency carriers often have very poor SNR. In order to avoid this ill effect, the algorithm may not use the slicing residuals from the first few carriers. The algorithm may use only carriers with very good SNRs in the iterative PNA updates. The number of carriers that are excluded from the processing will depend upon the physical medium over which the DMT transmission is taking place, as different media will have different typical SNR profiles.

Thus, even if the selected unprocessed measured tone is part of the subset, it may not carry data. In that case (block 1322), processing of that measured tone terminates and the loop returns to the beginning.

Up until this point, the assumption has been that all of the slices are successful, i.e., that what is interpreted as the ideal vector V is actually the same vector that was intended by the transmitter. In practice, incorrect slices will sometimes occur. In such cases, the slicing residual is actually misleading, and using it to update the PNA could actually degrade the accuracy of our estimate. The averaging that is performed provides robustness against this problem, and provided that the number of measured tones averaged into PNA is sufficiently large, should yield good results.

The handling of an incorrect slice might depend upon whether coding has been implemented on the channel. An incorrect slice will result in an error in the data. If no coding has been implemented, then the data will likely be discarded anyway (block 1324), and further incorrect slices don't have much adverse effect. On the other hand, if an error correcting code has been implemented, the algorithm is adjusted to help prevent one incorrect slice from corrupting the following slices.

To accomplish this in some embodiments, estimating the phase error for a particular measured tone (block 1314), normalizing the estimated phase error (block 1316) and updating the average phase error (block 1308) are performed only if a magnitude of the slicing residual for the measured tone is less than a threshold (block 1324).

Once all of the subset of measured tones have been processed (block 1318), the method calculates an average sample timing error (block 1326). In one embodiment, computing the average timing error comprises applying the following equation:

$$\text{average sample timing error} = \frac{1}{2\pi} PNA \cdot T \tag{15}$$

where:
PNA=average phase error; and
T=period of a single symbol, not including a cyclic prefix (see FIG. 7).

In another embodiment, computing the average timing error may include applying the following equation:

$$\text{average sample timing error} = \frac{1}{R \cdot \pi} PNA \cdot M \tag{16}$$

where:
PNA=average phase error;
M=number of carriers in the signal that have been processed;
R=sampling rate (see FIG. 7).

The sliced data and timing error estimate are then returned (block 1328) for use in other processing.

The foregoing describes preferred embodiments of the invention and is given by way of example only. The invention is not limited to any of the specific features described herein, but includes all variations thereof within the scope of the appended claims.

What is claimed is:

1. A method for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the method comprising performing the following processing on each of a subset of the measured tones in the signal;
selecting an unprocessed measured tone;
adjusting a phase of the selected measured tone using an average phase error;
estimating a phase error for the selected measured tone; and
updating the average phase error with the estimated phase error, wherein estimating the phase error for the selected measured tone comprises
slicing the selected measured tone to associate it with an ideal tone;
computing a slicing residual for the selected measured tone;
computing the estimated phase error for the selected measured tone using the slicing residual; and
normalizing the estimated phase error.

2. The method of claim 1 wherein slicing the selected measured tone comprises selecting one of the ideal tones associated with the carrier associated with the selected measured tone that best approximates the selected measured tone.

3. The method of claim 1 wherein computing the slicing residual comprises subtracting a phasor representing a selected ideal tone from a phasor representing the selected measured tone.

4. The method of claim 1 wherein computing the estimated phase error for the selected measured tone comprises using the following equation:

$$P_k \approx \frac{imag(\langle E_k, V_k \rangle)}{w_k}$$

where $P_k$=phase error for measured tone k;
$E_k$=slicing residual for measured tone k (complex number);
$V_k$=ideal tone for measured tone k (complex number);
$\langle E_k, V_k \rangle$=inner product of $E_k$ and $V_k$;
imag(A)=imaginary part of A, wherein A=$\langle E_k, V_k \rangle$; and
$w_k$=weighting factor for measured tone k.

5. The method of claim 4 wherein $w_k$=$\langle V_k, V_k \rangle$.

6. The method of claim 4 wherein $w_k$=var(V); where var(V) is the variance of the magnitudes of all of the ideal tones in the constellation associated with the carrier associated with measured tone k.

7. The method of claim 4 wherein $w_k$=dev(V)·mag($V_k$); where dev(V) is the standard deviation of the magnitudes of all of the ideal tones in the constellation associated with the carrier associated with measured tone k; and mag($V_k$) is the magnitude of $V_k$.

8. The method of claim 1 wherein normalizing the estimated phase error comprises applying the following equation:

$$NP_k = \frac{P_k}{s_k}$$

where $NP_k$=normalized estimated phase error for measured tone k;
$P_k$=estimated phase error for measured tone k; and
$s_k$=normalization factor for measured tone k.

9. The method of claim 8 wherein $s_k$ is chosen to normalize the phase error computed for measured tone k to the frequency of a reference tone.

10. The method of claim 8 wherein the measured tones are numbered from 1 to N; the frequency of each measured tone is the number of the measured tone multiplied by the frequency of tone 1; and $s_k$=the number of measured tone k.

11. The method of claim 1 wherein selecting comprises selecting an unprocessed measured tone that has a lower frequency than any other unprocessed measured tone.

12. The method of claim 1 wherein
not all of the constellations of ideal tones include the same number of ideal tones; and
selecting comprises selecting an unprocessed measured tone associated with a carrier which is associated with a constellation of ideal tones, the constellation having a number of ideal tones that does not exceed the number of ideal tones in the constellation associated with any other unprocessed measured tone.

13. The method of claim 1 wherein selecting comprises selecting an unprocessed measured tone that is not more susceptible to slicing error because of phase error than any other measured tone.

14. The method of claim 1 wherein estimating and updating are performed only if a magnitude of the slicing residual for the measured tone is less than a threshold.

15. A method for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the method comprising performing the following processing on each of a subset of the measured tones in the signal:

selecting an unprocessed measured tone;
adjusting a phase of the selected measured tone using an average phase error;
estimating a phase error for the selected measured tone; and
updating the average phase error with the estimated phase error; wherein estimating comprises applying an equation selected from the group consisting of:

$$NP_k = \frac{imag(\langle E_k, V_k \rangle)}{s_k \cdot \langle V_k, V_k \rangle};$$

$$NP_k = \frac{imag(\langle E_k, V_k \rangle)}{s_k \cdot var(V)}; \text{ and}$$

$$NP_k = \frac{imag(\langle E_k, V_k \rangle)}{s_k \cdot dev(V) \cdot mag(V_k)}$$

where $NP_k$=normalized phase error for tone k;
$E_k$=slicing residual for measured tone k (complex number);
$V_k$=ideal phasor associated with measured tone k (complex number);
$s_k$=normalization factor for measured tone k;
$\langle V_k, V_k \rangle$=inner product of $V_k$ with itself;
imag(A)=imaginary part of A, wherein A=$\langle E_k, V_k \rangle$;
var(V) variance of the magnitudes of all of the ideal tones in the constellation associated with measured tone k;
dev(V)=standard deviation of the magnitudes of all of the ideal tones in the constellation associated with measured tone k; and
mag($V_k$)=magnitude of $V_k$.

16. A method for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the method comprising performing the following processing on each of a subset at the measured tones in the signal:

selecting an unprocessed measured tone;
adjusting a phase of the selected measured tone using an average phase error;
estimating a phase error for the selected measured tone; and
updating the average phase error with the estimated phase error;

wherein updating the average phase error comprises applying the following equation:

$$PNA = \sum_{k=1}^{M} \frac{1}{M} \cdot NP_k$$

where

PNA=average phase error;
M=number of tones in the signal that have been processed;
$NP_k$=normalized phase error for tone k.

17. A method for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the method comprising performing the following processing on each of a subset of the measured tones in the signal:

selecting an unprocessed measured tone;

adjusting a phase of the selected measured tone using an average phase error;

estimating a phase error for the selected measured tone: and updating the average phase error with the estimated phase error.

wherein updating the average phase error comprises applying the following equation:

$$PNA = \left(\frac{x-1}{x}\right)^M \cdot NP_0 + \sum_{k=1}^{M} \frac{(x-1)^{M-k}}{x^{M+1-k}} \cdot NP_k$$

where

PNA=average phase error;

x=a number greater than 1;

M=the number of carriers in the signal;

$NP_0$=an initial value for PNA;

$NP_k$=normalized phase error for tone k.

18. A method for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the method comprising selecting a subset of measured tones in the signal and performing the following process on the selected subset:

selecting an unprocessed measured tone;

adjusting a phase of the selected measured tone using an average phase error;

estimating a phase error for the selected measured tone; and updating the average phase error with the estimated phase error, wherein the subset includes all measured tones which are associated with a carrier which has a signal-to-noise ratio greater than a signal-to-noise ratio threshold.

19. The method of claim 18 wherein the subset includes all measured tones associated with a carrier that is carrying data.

20. The method of claim 18 wherein the subset includes all measured tones which are associated with carriers having a frequency greater than a minimum frequency.

21. A method for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the method comprising:

performing the following processing on each of a subset of the measured tones in the signal:
selecting an unprocessed measured tone;
adjusting a phase of the selected measured tone using an average phase error;
estimating a phase error for the selected measured tone; and
updating the average phase error with the estimated phase error;

wherein computing the average timing error comprises applying an equation selected from the group consisting of:

$$\text{average sample timing error} = \frac{1}{2\pi} PNA \cdot T$$

and $$\text{average sample timing error} = \frac{1}{R \cdot \pi} PNA \cdot M$$

where

PNA=average phase error;

T=period of a single symbol, not including a cyclic prefix;

M=number of carriers in the signal that have been processed; and

R=sampling rate.

22. The method of claim 21 further comprising using the average sample timing error to adjust a time at which a sample of the signal is taken.

23. An article of manufacture comprising a program storage medium having computer readable program code embodied therein for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the computer readable program code in the article of manufacture comprising computer readable program code for performing the following processing on each of a subset of the measured tones in the signal;

computer readable program code for selecting an unprocessed measured tone;

computer readable program code for adjusting a phase of the selected measured tone using an average phase error;

computer readable program code for estimating a phase error for the selected measured tone; and computer readable program code for updating the average phase error with the estimated phase error, wherein the computer readable program code for estimating the phase error for the selected measured tone comprises:

computer readable program code for slicing the selected measured tone to associate it with an ideal tone;

computer readable program code for computing a slicing residual for the measured tone;

computer readable program code for computing the estimated phase error for the selected measured tone using the slicing residual; and computer readable program code for normalizing the estimated phase error.

24. The article of manufacture of claim 23 wherein the computer readable program code for slicing the selected measured tone comprises computer readable program code for selecting one of the ideal tones associated with the carrier associated with the selected measured tone that best approximates the selected measured tone.

25. The method of claim 23 wherein the computer readable program code for computing the slicing residual comprises computer readable program code for subtracting a phasor representing a selected ideal tone from a phasor representing the selected measured tone.

26. The article of manufacture of claim 23 wherein the computer readable program code for computing the estimated phase error for the selected measured tone comprises computer readable program code for using the following equation:

$$P_k \approx \frac{\mathrm{imag}(\langle E_k, V_k \rangle)}{w_k}$$

where $P_k$=phase error for measured tone k;

$E_k$=slicing residual for measured tone k (complex number);

$V_k$=ideal tone for measured tone k (complex number);

$\langle E_k, V_k \rangle$=inner product of $E_k$ and $V_k$;

imag(A)=imaginary part of A, wherein A=$\langle E_k, V_k \rangle$; and $w_k$=weighting factor for measured tone k.

27. The article of manufacture of claim 26 wherein $w_k = \langle V_k, V_k \rangle$.

28. The article of manufacture of claim 26 wherein $w_k$=var(V); where var(V) is the variance of the magnitudes of all of the ideal tones in the constellation associated with the carrier associated with measured tone k.

29. The article of manufacture of claim 26 wherein $w_k$=dev(V)·mag($V_k$); where dev(V) is the standard deviation of the magnitudes of all of the ideal tones in the constellation associated with the carrier associated with measured tone k; and mag($V_k$) is the magnitude of $V_k$.

30. The article of manufacture of claim 23 wherein the computer readable program code for normalizing the estimated phase error comprises computer readable program code for applying the following equation:

$$NP_k = \frac{P_k}{s_k}$$

where $NP_k$=normalized estimated phase error for measured tone k;

$P_k$=estimated phase error for measured tone k; and $s_k$=normalization factor for measured tone k.

31. The article of manufacture of claim 30 wherein $s_k$ is chosen to normalize the phase error computed for measured tone k to the frequency of a reference tone.

32. The article of manufacture of claim 30 wherein the measured tones are numbered from 1 to N; the frequency of each measured tone is the number of the measured tone multiplied by the frequency of tone 1; and $s_k$=the number of measured tone k.

33. The article of manufacture of claim 23 wherein the computer readable program code for updating the average phase error comprises computer readable program code for applying the following equation:

$$PNA = \sum_{k=1}^{M} \frac{1}{M} \cdot NP_k$$

where

PNA=average phase error;

M=number of tones in the signal that have been processed;

$NP_k$=normalized phase error for tone k.

34. The article of manufacture of claim 23 wherein updating the average phase error comprises computing a weighted average.

35. The article of manufacture of claim 23 wherein updating the average phase error comprises applying the following equations:

$$PNA = \left(\frac{x-1}{x}\right)^M \cdot NP_0 + \sum_{k=1}^{M} \frac{(x-1)^{M-k}}{x^{M+1-k}} \cdot NP_k$$

where

PNA=average phase error;

x=a number greater that 1;

M=the number of carriers in the signal;

$NP_0$=an initial value for PNA;

$NP_k$=normalized phase error for tone k.

36. The article of manufacture of claim 23 further comprising:

computer readable program code for deriving an initial phase error from a pilot tone transmitted with a signal.

37. The article of manufacture of claim 23 wherein the subset includes all measured tones which are associated with a carrier which has a signal-to-noise ratio greater than a signal-to-noise ratio threshold.

38. An article of manufacture comprising a program storage medium having computer readable program code embodied therein for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the computer readable program code in the article of manufacture comprising:

computer readable program code for performing the following processing on each of a subset of the measured tones in the signal;

computer readable program code for selecting an unprocessed measured tone;

computer readable program code for adjusting a phase of the selected measured tone using an average phase error;

computer readable program code for estimating a phase error for the selected measured tone; and computer readable program code for updating the average phase error with the estimated phase error, wherein the computer readable program code for estimating comprises computer readable program code for applying an equation selected from the group consisting of:

$$NP_k = \frac{imag(\langle E_k, V_k \rangle)}{s_k \cdot \langle V_k, V_k \rangle};$$

$$NP_k = \frac{imag(\langle E_k, V_k \rangle)}{s_k \cdot \text{var}(V)} \quad \text{and}$$

$$NP_k = \frac{imag(\langle E_k, V_k \rangle)}{s_k \cdot dev(V) \cdot mag(V_k)}$$

and
where $NP_k$=normalized phase error for tone k;

$E_k$=slicing residual for measured tone k (complex number);

$V_k$=ideal phasor associated with measured tone k (complex number);

$s_k$=normalization factor for measured tone k;

$\langle V_k, V_k \rangle$=inner product of $E_k$ and $V_k$ $\langle V_k, V_k \rangle$=inner product of $V_k$ with itself;

imag(A)=imaginary part of A, wherein A =$\langle E_k, V_k \rangle$;

var(V)=variance of the magnitudes of all the ideal tones in the constellation associated with measured tone k;

dev(V)=standard deviation of the magnitudes of all of the ideal tones in the constellation associated with measured tone k; and mag($V_k$)=magnitude of $V_k$.

39. An article of manufacture comprising a program storage medium having computer readable program code embodied therein for estimating an average sample timing error in samples taken of a signal comprising a plurality of measured tones, each measured tone having a frequency, a phase, and a magnitude, each measured tone representing one of a plurality of modulated carriers, each carrier having an associated constellation of ideal tones, each ideal tone representing an ideal modulation of its associated carrier, the computer readable program code in the article of manufacture comprising:

computer readable program code for performing the following processing on each of a subset of the measured tones in the signal;

computer readable program code for selecting an unprocessed measured tone;

computer readable program code for adjusting a phase of the selected measured tone using an average phase error;

computer readable program code for estimating a phase error for the selected measured tone; and computer readable program code for updating the average phase error with the estimated phase error, wherein the subset includes all measured tones associated with a carrier which has a signal-to-noise ratio greater that a signal-to-noise ratio threshold.

40. The article of manufacture of claim 39 wherein the subset includes all measured tones which are associated with carriers having a frequency greater than a minimum frequency.

41. The article of manufacture of claim 39 wherein the computer readable program code for selecting comprises computer readable program code for selecting an unprocessed measured tone that has a lower frequency than any other unprocessed measured tone.

42. The article of manufacture of claim 39 wherein not all of the constellations of ideal tones include the same number of ideal tones; and computer readable program code for selecting comprises computer readable program code for selecting an unprocessed measured tone associated with a carrier which is associated with a constellation of ideal tones, the constellation having a number of ideal tones that does not exceed the number of ideal tones in the constellation associated with any other unprocessed measured tone.

43. The article of manufacture of claim 39 wherein the computer readable program code for selecting comprises computer readable program code for selecting an unprocessed measured tone that is not more susceptible to slicing error because of phase error than any other unprocessed measured tone.

44. The article of manufacture of claim 39 wherein the computer readable program code for estimating and updating are executed only if a magnitude of a slicing residual for the measured tone is less than a threshold.

45. The article of manufacture of claim 39 further comprising computer readable program code for computing the average sample timing error from the average phase error.

46. The article of manufacture of claim 45 wherein the computer readable program code for computing the average timing error comprises computer readable program code for applying the following equation:

$$\text{average sample timing error} = \frac{1}{2\pi} PNA \cdot T$$

where

PNA=average phase error; and

T=period of a single symbol, not including a cyclic prefix.

47. The article of manufacture of claim 45 wherein the computer readable program code for computing the average timing error comprises computer readable program code for applying the following equation:

$$\text{average sample timing error} = \frac{1}{R \cdot \pi} PNA \cdot M$$

PNA=average phase error;

M=number of carriers in the signal that have been processed;

R=sampling rate.

* * * * *